UNITED STATES PATENT OFFICE.

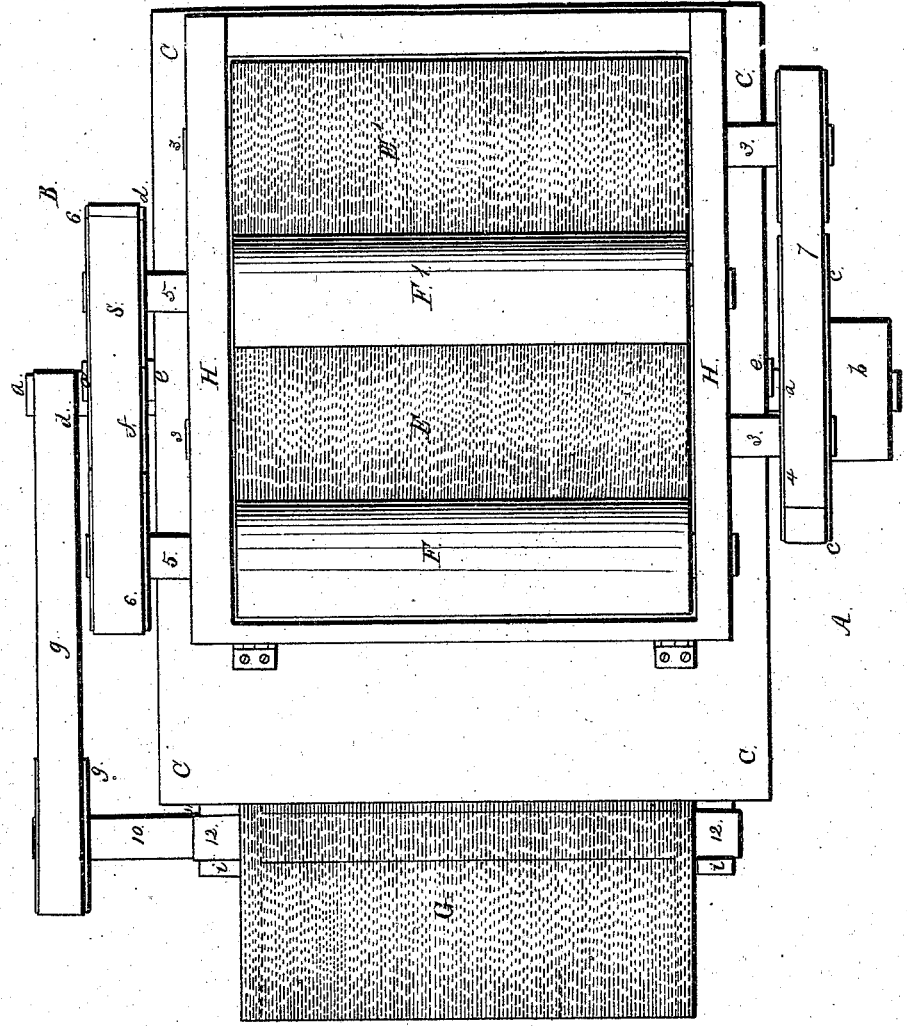

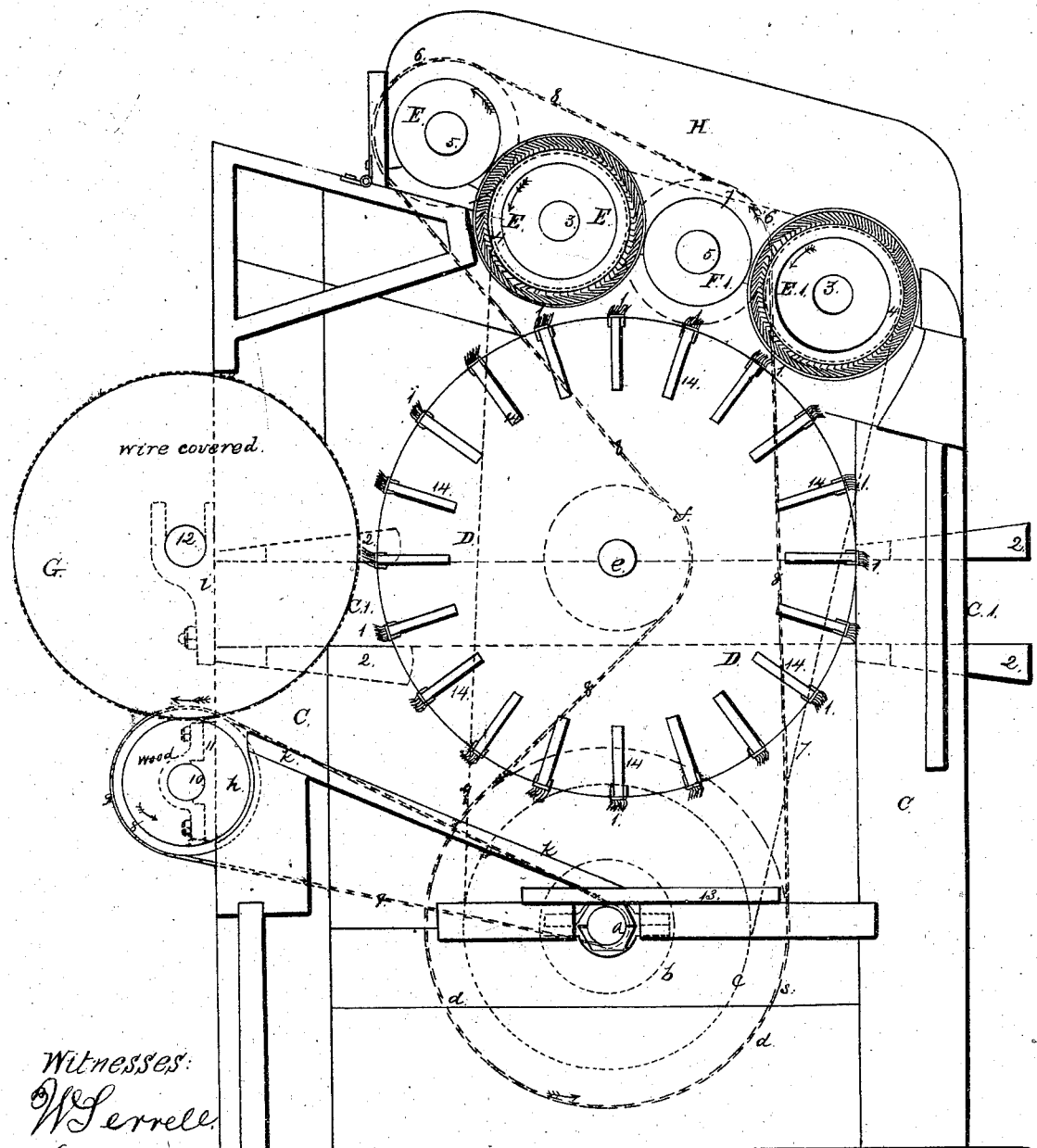

STEPHEN R. PARKHURST, OF NEW YORK, N. Y.

COTTON-GIN.

Specification of Letters Patent No. 7,307, dated April 23, 1850.

*To all whom it may concern:*

Be it known that I, STEPHEN R. PARKHURST, of the city of New York, State of New York, machinist, have invented, made, and applied to use certain new and useful improvements in the means of separating cotton from seeds or dirt by carding and delivering the clean material from one end of the machine in a collected sheet or continuous bat, thereby removing all the dangers and difficulties of what is known as the "gauze-room," the separated seeds and dirt being thrown out in another direction; I therefore term these improvements collectively as "Parkhurst's seed-cotton carding and batting machine," for which I seek Letters Patent of the United States; and the construction, operation, and effects of the said improvements are fully and substantially set forth and shown in the following description and in the drawing annexed to and making part of this specification of my said improvements, wherein—

Figure 1, is a plan, and Fig. 2, is a sectional elevation of the machine, in which the belts and pulleys, or drums, on the side A, of Fig. 1, are shown by full red lines; and the like parts, on the side B, of Fig. 1, are shown by black dotted lines.

Like letters and numbers, as marks of reference, apply to the same parts in each figure as follows:

C, C, are the frames, supporting the working parts; $a$, is the principal driving shaft, having on the side A, a drum or pulley $b$, to connect to the power for driving the machine, and a drum $c$, to communicate the power; on the side B, of Fig. 1, on the shaft $a$, is a second drum $d$, and above these a bearing piece $C^1$, is fitted with wedges 2, 2, to adjust the height in the frames C, C. These pieces carry a shaft $e$, with a drum $f$, on the side B, of Fig. 1. Within the frames, the shaft $e$, carries the fan blower and cleaning wheel D, fitted with fan or blower plates 14, in any usual manner, and carrying on the edge of each plate 14, a strip of card wires 1, 1. Above this, two shafts 3, 3, each carry a drum 4, on the side A, Fig. 1, and within the frames, carry card cylinders E, $E^1$, each of which is formed of wood or metal, and clothed with card teeth, set in leather, in the usual manner, and when so fitted, the spaces, between the teeth, are filled in with gutta percha, or any similar substance, in a state, sufficiently warm and limpid, to agglutinize, and adhere firmly together, when cooled, in such a manner, that when the cards on each cylinder are thus filled in, the gutta percha forms a solid substance, inclosing each card tooth, and so effectually supports each tooth, that it cannot be moved, without displacing the gutta percha around it, and when each cylinder is thus fitted, the application of a warm iron to the surface, while in rotation, will dress down any inequalities of the surface, and leave the points of the card wires all at, or nearly at, an uniform projection, above the surface of the gutta percha.

At 5, 5, are two shafts each having a drum 6, to carry and drive two smooth wood or metal rollers F, $F^1$, that lie and move close to, but not in contact with the teeth points, on the cylinder E, $E^1$. The belt 7, shown by red lines Fig. 2, and on the side A, Fig. 1, connects the drum $e$, with the two drums 4, 4, by overlying them, and driving the cylinders E, $E^1$, in the same direction, as shown by the arrows on them; and the belt 8, on the side B, shown by black dotted lines in Fig. 2, takes one side of the drum $d$, to the fan blower D, in the direction of the arrows on it, in Fig. 2, and above this the belt 8, overlies the two drums 6, 6, to rotate the rollers F, $F^1$, in the direction of the arrows on them; the shaft $a$, is prolonged beyond the drum $d$, on the side B, of Fig. 1, to take the belt 9, shown by a black dotted line, in Fig. 2, which goes to a drum $g$, on the shaft 10, set in bearings 11, carrying the batting roller $h$, that underlies the batting cylinder G, this is made as an open wire gauze drum, that rotates on the roller $h$, being held in place by a shaft 12, set in open bearings $i$, that allows the drum G to rise and fall, as it rotates over the cotton, as that passes out; a mote board $k$, lies under the fan blower D, and has behind it, a slide board 13, that is movable, to remove dirt, or dust; and H, is an open box, or hopper, to receive the seed cotton for cleaning; when thus made, the operation of the machine in motion, is, that on placing seed cotton in the hopper H, the points of the teeth on the cylinders E, $E^1$, take the fibers of the cotton, and card it from the seed, against the rollers F, $F^1$, the seeds fall at the front of the machine; the cotton, on the card cylinders, is taken off beneath, by the card strips on the fan blower D, and carried down, to over the mote board 13, where the blast drives the cotton outward, against the batting roller $h$, and batting cylinder G, these, rotating outward, take the cotton between them, and deliver it in a continuous sheet, or bat, ready for packing.

The differences between this machine, and all others, are that the cylinders E, $E^1$, acting with an uniform surface of card teeth, stiffened with gutta-percha, or other like substance, card the fibers from the seed, without separating the fibers of different seeds that are interlocked in the growth of the fiber, so that the fibers remain together, as they grew until separated by the usual process of manufacture; and are not cut, or broken, by dragging them apart; the dust, or chaff, in the cotton, is blown through the wire gauze drum; the heavier parts of dirt falling behind, and below the slide board 13, which may be placed to operate as required, with different foreign substances, which are in the cotton; and the clean cotton passes out beneath, in a sheet or bat, as described, and is ready either for packing or use.

I have found, that equal speeds of the carding cylinders, and rollers, act as equally well, as with any variation; the only needful difference is, that the fan blower should run fast enough, to take the cotton from the cylinders above it.

Having described the construction, operation, and effect, of this machine, what I claim as new, and of my own invention, and desire to secure by Letters Patent of the United States, is—

1. The making card cylinders with gutta-percha, or other similar substance, filled in among the teeth, to form a regular surface, and stiffen the teeth, whether such cylinders, so fitted, are used for this, or any other purpose, for which they are available.

2. I claim the application of one, or more, card cylinders with gutta-percha, or other similar substance between the teeth, in connection with an equal number of smooth cylinders, to card cotton from the seed, substantially as described and shown.

3. I claim the application of the wire gauze drum G, and roller $h$, beneath; first, for the purpose of allowing the blast to drive the dust and chaff from the cotton; and second, for the purpose of leading the cleaned cotton out, in a sheet, or bat, whether this roller and drum be applied to act with card, or with the common saw gin.

In witness whereof I have hereunto signed my name this thirteenth day of February, one thousand eight hundred and fifty.

STEPHEN R. PARKHURST.

Witnesses:
WM. SERRELL,
LEMUEL W. SERRELL.